April 26, 1932. W. C. MOORE 1,855,485
BRAKE
Filed May 11, 1928 2 Sheets-Sheet 1
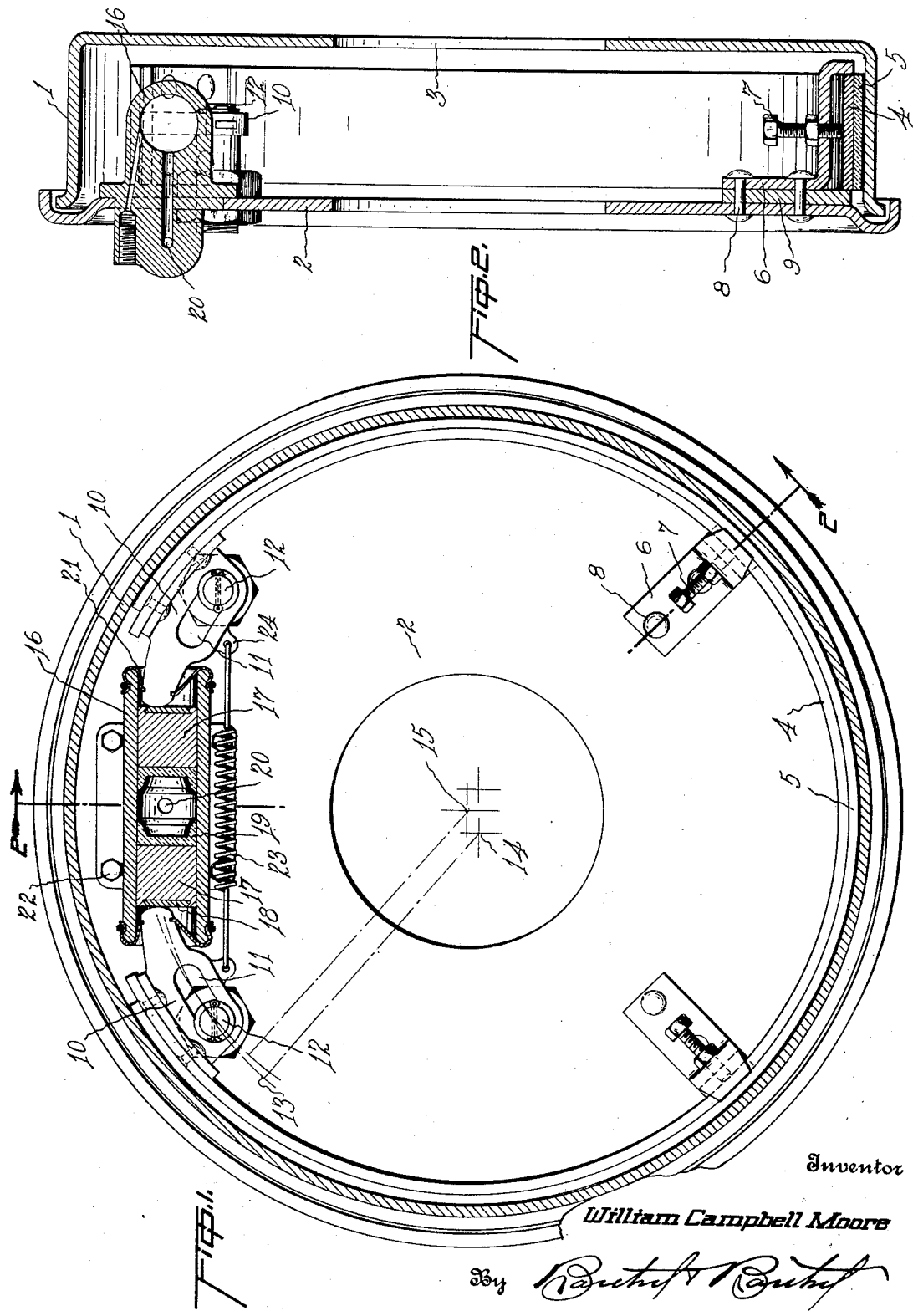
Inventor
William Campbell Moore
By
Attorneys April 26, 1932.　　　W. C. MOORE　　　1,855,485
BRAKE
Filed May 11, 1928　　2 Sheets-Sheet 2
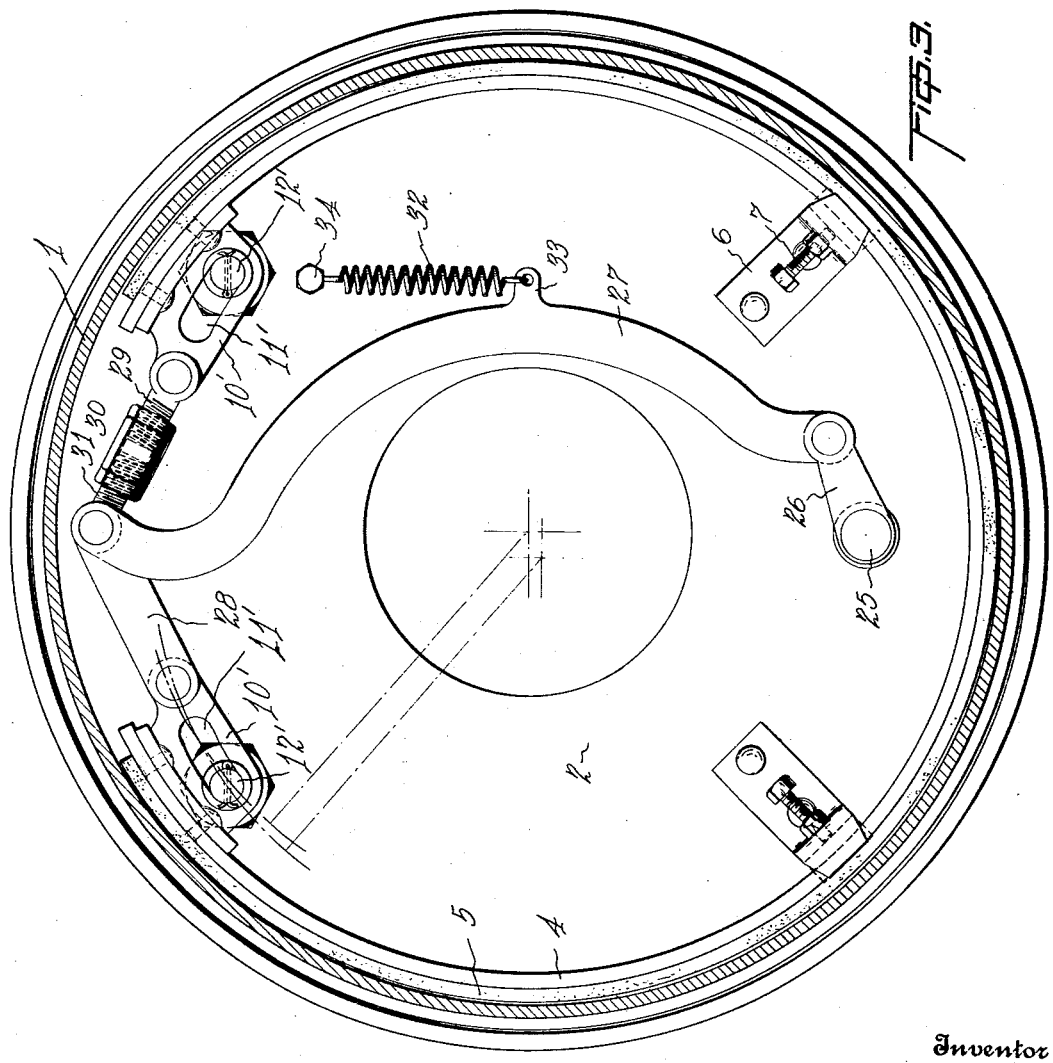
Inventor
William Campbell Moore Patented Apr. 26, 1932

1,855,485

UNITED STATES PATENT OFFICE

WILLIAM CAMPBELL MOORE, OF DETROIT, MICHIGAN

BRAKE

Application filed May 11, 1928. Serial No. 276,841.

The present invention pertains to a novel brake of the internal band type, and the principal object is to provide a device of this character wherein the band may be brought into full contact with the brake drum.

The internal band type of brake is acknowledged to be desirable for automotive installation because of the protection of the working parts from dust, dirt and moisture, but there has been difficulty in avoiding chattering of the brake band against the drum, particularly because of the incomplete contact that the band makes with the drum. The present invention provides means for expanding the band in such a manner that all points thereof come into contact with the brake drum, whereby any objectionable looseness and chattering is avoided. This purpose is accomplished by guiding the ends of the band in arcs eccentric of the drum itself, so that these ends are positively brought into engagement with the drum.

The invention is fully disclosed by way of example in the following description and in the accompanying drawings, in which—

Figure 1 is a circumferential section of a brake constructed according to the invention;

Fig. 2 is a diametrical section on the line 2—2 of Figure 1; and

Fig. 3 is a circumferential section of a modification.

Reference to these views will now be made by use of like characters which are employed to designate corresponding parts throughout. In Figures 1 and 2 is illustrated a brake of the internal band type and operable by hydraulic means. The working parts are enclosed in a drum 1 having an open side which is finally closed by a carrier plate 2 secured to the fixed axle in a manner already well known in the art. The base of the drum has a central aperture 3 through which the end of the axle protrudes.

The drum contains an expansible band or shoe 4 of substantially arcuate configuration and equipped on its outer surface with brake lining 5 for engaging the inner surface of the drum. Anti-rattle clips are secured to the carrier plate at intervals, and these consist each of an angular plate 6 through which is threaded a screw 7 for pressing the brake band towards the brake drum. Rivets 8 support the brackets against the carrier plate, and suitable spacers 9 are interposed.

To each of the ends of the brake band 4 is secured an operating cam 10 having a substantially longitudinal slot 11. Studs 12 are fixed to the carrier plate and received in the slots 11 for guiding the cams when the latter are spread by a device presently to be described. The longitudinal axis of the slots 11 are curved on an arc 13 which has its center 14 somewhat displaced from the center 15 of the drum. The arc 13 approaches the drum in the spreading direction of the cams 10 so that when the brake is applied, the ends of the brake band as well as the intermediate parts thereof will be positively brought into contact with the drum. This action is to be distinguished from the operation of brakes from this general type wherein the expansion of the brake band is such that the ends fail to contact with the brake drum and give rise to chattering and inefficient operation.

The spreading device for the brake shoes includes a cylinder 16 containing a pair of spaced pistons 17 engaging the respective cams. The pistons are preferably provided with wear plates 18 which contact with the ends of the cams. The inner end of each piston has a cup 19, and the cylinder has a suitably controlled fluid inlet port 20 leading to the space between the pistons. The ends of the cams are obviously received in the ends of the cylinder as shown in Figure 1, and the latter ends are closed by dust covers 21 which encircle the ends of the cams and thereby prevent access of dust and dirt to the pistons. The cylinder is secured to the carrier plate by bolts 22 as clearly shown in Figure 1.

The brake band 4 is normally contracted or drawn out of engagement with the drum by a spring 23 which has its ends joined to ears 24 on the cams 10.

Figure 3 illustrates the application of the invention to a pedal controlled type of brake. The construction and relation of the brake drum, band and cams is the same as that shown and described in connection with Figures 1 and 2, but the hydraulic operating device is replaced by an operating means suitable for actuation mechanically by a rock shaft such as is generally included within the brake-operating mechanism adapted to be operated by the foot of the driver. On the carrier plate is journalled a stub shaft 25 which is adapted to be rocked when the brake is to be manipulated, the shaft being operated in the usual manner. An arm 26 extends from the shaft 25 and has its free end connected to one end of a link 27 which extends into the space between the slotted cams 10'. One of the cams is connected by a pivoted link 28 to the upper end of the link 27, while the other cam has pivoted thereto a threaded stud 29 which is joined by means of an adjustable turnbuckle 30 to a similar stud 31 pivoted to the upper end of the link 27. This adjustable device may be set to compensate for wear of the brake lining in the same manner that the anti-rattle clips 6, 7 may be adjusted for a like purpose. A spring 32 joining an ear 33 on an intermediate point of the link 27 to a stud 34 fixed to the carrier plate serves to lift the link 27 and thus normally contract the brake band, but when the shaft 25 is actuated the link 27 is depressed to a point where the links 28 and 29—31 spread the cams 10' and move the brake band towards the drum. As in Figures 1 and 2, the cams 10' are guided on studs 12', and the slots 11' are formed on an arc eccentric with respect to the center of the drum as already explained with reference to Figures 1 and 2.

As will be understood, the location of the axis 14, which forms the development point for the slot 11, is so close to the drum axis 15, that during the movement of member 10 the longitudinal component of the motion of the band produced in the direction of brake application will greatly exceed the radial component of such motion per unit of time. Since the band is free from securing relation to the plate at other points—the anti-rattle clips 6 simply preventing lateral movement of the band—it will be readily understood that the band expansion will be general rather than specifically at the ends, with the result that when the band ends reach contact condition the remainder of the band will be in such position as to quickly complete the brake application.

Although specific embodiments of the invention have been illustrated and described, it will be understood that various alterations in the details of construction may be made without departing from the scope of the invention as indicated by the appended claims.

What I claim is:—

1. In brake mechanism of the internal expanding type and in combination, a drum, a brake band positioned therein and adapted to co-operate with the drum for braking activity, a fixedly-positioned carrier plate adapted to form a housing wall for the brake-band, co-operating means carried by the plate and band and operative with the ends of the band for directing such ends during movements between active and inactive positions, and brake-applying means, said co-operating means serving to operatively connect the brake-applying means to the brake-band to translate movements of the applying means to the brake band, said co-operating means including a pair of members one of which is movable relatively to the other in an arcuate path the axis of which is spaced from the drum axis but so closely approaches the drum axis as to cause the longitudinal component of movement of the band end to greatly exceed the radial component of such movement per unit of time and thereby cause the applying movements of the band to expand the band into close proximity to the drum face in advance of producing the end contact relation to provide a rapid completion of band contact when the end contact relation is produced, said band being free from secured relation to the plate at all points other than through such co-operating means.

2. Mechanism as in claim 1, characterized in that the pair of members comprises a stud carried by the plate and a slotted cam carried by the band end, the slot of the cam being arcuate and developed from the axis point closely approaching the drum axis.

In testimony whereof I affix my signature.

WILLIAM CAMPBELL MOORE.